United States Patent [19]
Achener

[11] 3,907,536
[45] Sept. 23, 1975

[54] METHOD FOR DEPOSITING SILICA ON A FUSED SILICA TUBE
[75] Inventor: Claude Achener, Paris, France
[73] Assignee: Quartz & Silice, S.A., Paris, France
[22] Filed: Feb. 27, 1974
[21] Appl. No.: 446,464

[30] Foreign Application Priority Data
Mar. 8, 1973 France .............................. 73.08317

[52] U.S. Cl. .......................... 65/60; 65/3; 65/109; 65/110; 65/120; 65/279; 65/DIG. 8; 65/DIG. 7; 427/423; 427/414
[51] Int. Cl.² ..................... C03C 17/00; C03B 21/00; C03B 25/00
[58] Field of Search ........ 65/108, 109, 110, DIG. 8, 65/DIG. 7, 3, 60, 121, 279; 117/105.2, 110, 108, 109

[56] References Cited
UNITED STATES PATENTS

| | | | |
|---|---|---|---|
| 1,298,463 | 3/1919 | Corl et al. | 65/109 X |
| 1,645,086 | 10/1927 | Berry et al. | 65/109 |
| 2,958,899 | 11/1960 | Stein et al. | 65/3 X |
| 3,229,005 | 1/1966 | Reifenhauser | 65/110 X |
| 3,823,995 | 7/1974 | Carpenter | 65/3 X |

Primary Examiner—S. Leon Bashore
Assistant Examiner—Frank W. Miga
Attorney, Agent, or Firm—Kenway & Jenney

[57] ABSTRACT

In a process for continuously fabricating fused silica tubing of high optical quality and indeterminate length, molten drops of silica deposit on a zone of a longitudinally advancing and axially rotating supply tube of fused silica. In combination therewith, inflation and drawing operations redistribute the deposited silica and supply tube silica into a finished tube having highly uniform surfaces that are free from defects and irregularities. To form the molten drops, fine crystals of silica feed through the flame of a burner. In a preferred embodiment, the flame also heats and softens the supply tube to promote the fusion of the drops with the tube. A localized pressure differential between the interior and exterior surfaces of the tube accomplishes the desired inflating. A differential rate of advance of the tube with respect to the softened zone of the tube produces the desired drawing action. In a preferred embodiment, a new section of supply tube is periodically joined to the advancing supply tube at its trailing end to make the process continuous.

9 Claims, 8 Drawing Figures

METHOD FOR DEPOSITING SILICA ON A FUSED SILICA TUBE

BACKGROUND OF THE INVENTION

This invention relates in general to the manufacture of tubes in vitreous silica, and more specifically to the continuous manufacture of transparent siliceous tubing that has a high degree of dimensional uniformity and is substantially free from surface irregularities.

Vitreous silica, because of its optical quality and high melting point, is widely used in thermometers, optical instruments, and the like. However, the combination of its high melting point and high viscosity make it a difficult and costly material to fabricate. Further, the presence of minute quantities of impurities can cause serious discolorations, bubbles and devitrification.

U.S. Pat. No. 2,852,891 issued Sept. 23, 1958 to H. J. George discloses a standard process and apparatus for fabricating hollow shapes of siliceous materials by directing a flow of pure transparent fused silica downwardly through an annular passage formed between a die ring and a die core. Since the molten silica must be maintained at a temperature usually in excess of 2,000°C, the die is manufactured from a refractory material such as graphite, tungsten or molybdenum. It has been found, however, that regardless of the type of material used, or other precautions taken, there is some chemical reaction between the die material, the molten silica and the atmosphere. This reaction causes irregularities to form on the portion of the die that is in contact with the silica. As a result, these irregularities produce defects such as longitudinal streaks in the finished product.

Such defects are a particularly serious problem in the production of iodine lamps. The longitudinal streaks act as cylindrical lenses, focusing a heavy light density in certain regions and providing less illumination in other regions. Heretofore, no commercially feasible fabrication method has been devised that avoids the problem of contact between the molten silica and a solid material and therefore it has been extremely difficult to produce a product having the extremely smooth, regular surfaces required for use in iodine lamps and the like.

In addition to the problem of reaction with the dies, the George process suffers from various other disadvantages. First, the temperature, and hence the viscosity, of the silica must be carefully regulated, as it melts, flows and reforms into the desired shape. Second, it is difficult to center the die core within the die ring with a high degree of accuracy. This is significant since such an off-center die core will produce a non-uniform product which can also act as a cylindrical lens when used in the manufacture of the iodine lamps. Finally, it is usually desirable to utilize a mandrel, depending downwardly from the die core, to stabilize the formation of the inner surface of the fabricated article. Such a mandrel, however, provides another solid surface where the molten silica can react to form irregularities.

It is therefore a principal object of the invention to provide a fabrication process for tubes of pure transparent silica which does not require contact between molten silica and a solid material and which produces tubes having highly smooth, defect-free surfaces.

Another object of the invention is to provide a process for continuously fabricating such tubes of intermediate length, uniform dimensions, and close dimensional tolerances without the use of dies.

Still another object of the invention is to provide a process for readily fabricating such tubes in a variety of cross-sectional sizes.

Yet another object of the invention is to improve the economy and efficiency of the manufacture of siliceous tubing of high optical quality.

SUMMARY OF THE INVENTION

A principal feature of the invention is the deposit or accretion of molten drops of silica on a supply tube of silica that is longitudinally advancing and axially rotating in a glass lathe. Heating raises the temperature of a zone of the tube so that it is softened when it is in the region of the deposit. A combination of inflating and drawing operations redistributes the increased wall thickness and linear mass of the tube into an output tube having highly smooth, defect-free surfaces.

The inflating operation tends to increase the diameter of the tube and decreases the wall thickness by creating a pressure differential between the interior and exterior surfaces of the softened section of the tube. The drawing operation tends to reduce the tube diameter and elongates the tube through a differential rate of advance between the portions of the tube disposed on opposite sides of the softened zone of the tube. The process is made continuous by periodically soldering a new piece of silica tube to the trailing end of the supply tube.

In a preferred embodiment, the molten drop of silica form when a stream of fine crystals of silica passes through the flame of a burner which also serves to soften the supply tube. In addition, the accretion, inflation and drawing operations can be repeated, using the output of one such combination of operations as the input to another such combination. A proper selection of the deposit rate, the pressure differential and the differential rate of advance, produces a finished tube of predetermined dimensions and close dimensional tolerances.

BRIEF DESCRIPTION OF THE DRAWINGS

The several features and advantages of the invention will be apparent from the following detailed description of preferred embodiments thereof selected for purposes of illustration and shown in the accompanying drawings in which.

BRIEF DESCRIPTION OF THE PREFERRED EMBODIMENTS

Figure 1:
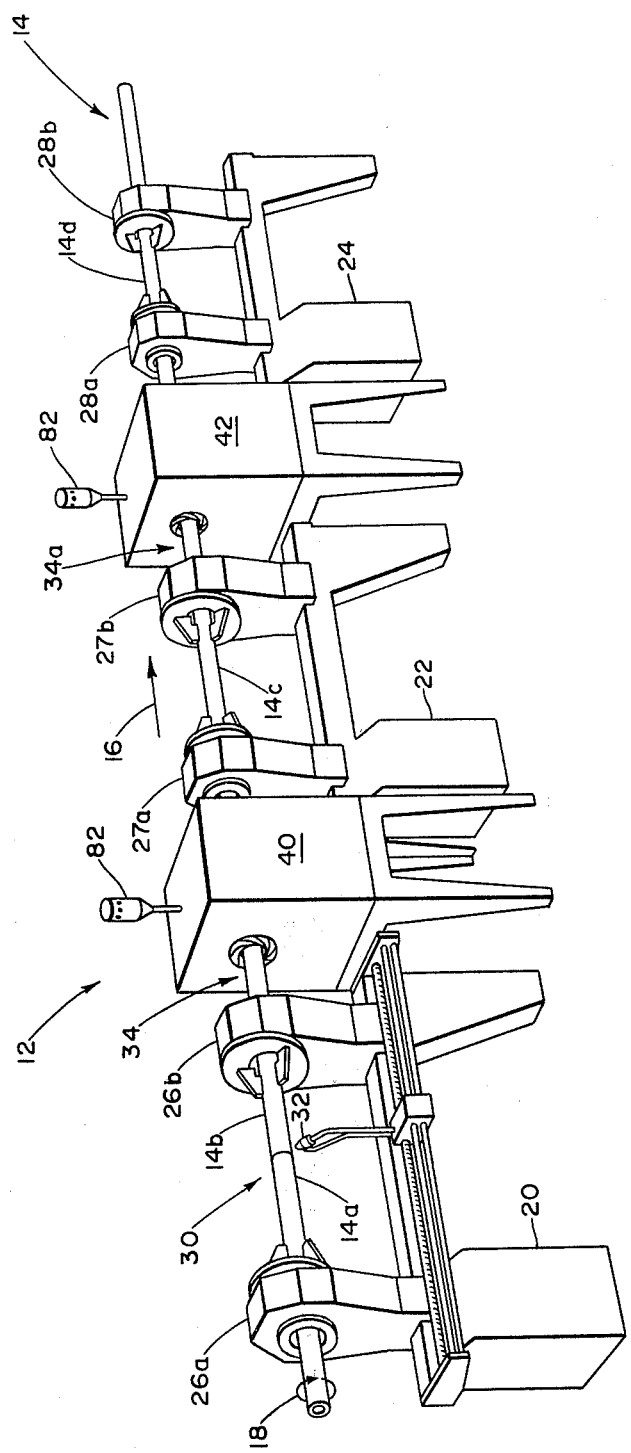
FIG. 1 is a perspective view of one embodiment of processing apparatus constructed in accordance with the principles of the invention.

FIG. 1 illustrates a production line 12, with much of the detail omitted, which fabricates a length of tubing 14 of pure vitreous silica. In this illustration, and throughout the description, the tubing 14 will be considered as advancing through the production line 12 along its longitudinal axis in a left to right direction as indicated by the arrow 16. Besides translating longitudinally, the tubing 14 is also in rotation about its central axis, as indicated by the arrow 18, with the rate of rotation being in general constant over the entire length of the tube.

The line 12 can be considered as an extended glass lathe with a number of appliances positioned between successive lathe benches 20, 22 and 24. Each bench carries a pair of movable chucks 26a and 26b, 27a and 27b, and 28a and 28b, respectively, which support the tubing 14 and provide the desired translational and rotational motion.

Lathe bench 20 defines a soldering station 30 where a burner 32 solders a section of tubing 14a to a supply or stock tube 14b. To the right of the chuck 28 is a deposit station 34 shown in FIG. 3 but omitted from FIG. 1 for clarity. At the deposit station 34, a spray 36 of fine crystals of pure silica passes through the flame of a burner 38a, where the crystals fuse into molten drops of silica and then deposit or accrete on the outer surface of the tube 14b. Preferably the maximum diameters of the crystals do not exceed 250 microns. The burner 38a, in cooperation with burners 38b and 38c, heats the tube 14b to its softening point in order to promote the adhesion and fusion of the depositing silica drops with the silica forming the tube 14b. The net effect of the deposit is to increase the wall thickness and mass per unit length of the tube 14b.

Immediately to the right of the deposit station 34, the tube 14b enters a pressure chamber 40 where the exterior of the tube 14b is exposed to a partial vacuum. The pressure difference between the interior and exterior surfaces of the tube tends to inflate the heated and deposited zone of the tubing 14b and increases its diameter. At the same time, a drawing or stretching operation acts on this zone of the tube 14b. The drawing is effected by advancing the chucks 27a and 27b at a higher rate than the chucks 26a and 26b. The drawing tends to elongate and reduce the diameter of the accreted zone of tube 14b. The net result of the depositing, inflating and drawing operations is a tube portion 14c which is a highly uniform redistribution of the deposited silica and the supply tube silica.

This combination of depositing, inflating and drawing operations is repeated in a similar manner at another deposit station 34a and pressure chamber 42 located between the chucks 27b and 28a. For the repeated operations, the tube portion 14c plays the same role as the tube portion 14b at the station 34 and chamber 40. The finished tube portion 14d at the output end of the production line 12 is therefore composed to a large degree of the deposited silica with dimensions that are accurately controlled through a proper choice of operating parameters. These parameters and their interrelation will be discussed in greater detail hereinbelow.

Figure 2:
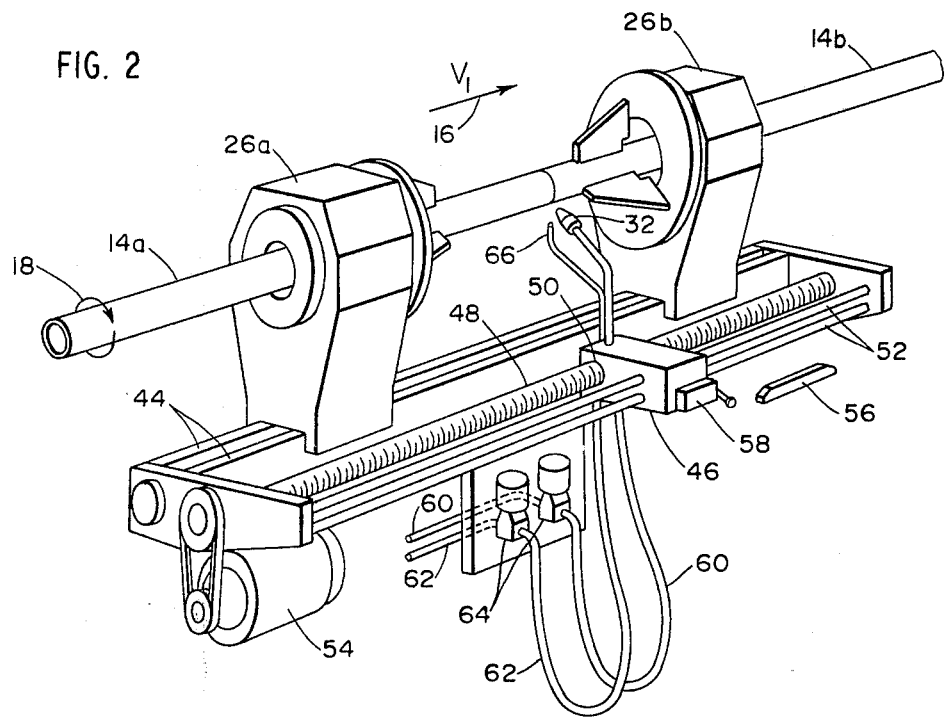
FIG. 2 is an enlarged view of the soldering station shown in FIG. 1.

FIG. 2 illustrates in greater detail the soldering station 30. The chucks 26a and 26b, of conventional design, each advance on the rails 44 at a velocity $V_1$ and in the direction of the arrow 16. Simultaneously the burner 32, mounted on a carriage 46, advances at the same velocity $V_1$ through the rotation of a lead screw 48 threaded in a fixed nut 50 incorporated in the carriage 46. A pair of slide rods 52 support the carriage 46 over its full range of movement. A reversible electric motor 54 actuates the lead screw 48. Adjustable stops 56 (only one of which is shown) trip limit switches 58 (only one of which is shown) which control the motor 54. Conduits 60 and 62 supply combustible gas such as oxygen and propane to the burner 32. The solenoid valves 64 control the flow of these gases to the burner, and the valves are controlled in turn by the limit switches 58. A burner starting device 66 assures that the burner 32 lights whenever the gases are supplied to the burner.

In operation, chucks 26a and 26b hold the tube portions 14a and 14b in aligned, abutting relation, with both portions advancing and rotating at the same speeds. As the portions advance, the burner 32 heats the abutting ends until they fuse. The amount of time required for the soldering operation varies with the size of the tubes portions in use (the dimensions of the portions 14a and 14b are in general the same). This time period is adjusted by moving the stops 56. When the soldering is completed, the chucks 26a and 26b are returned in succession to their respective starting positions. This soldering operation is repeated as required to maintain a continuous input of the tube 14b to the production line 12.

Figure 3:
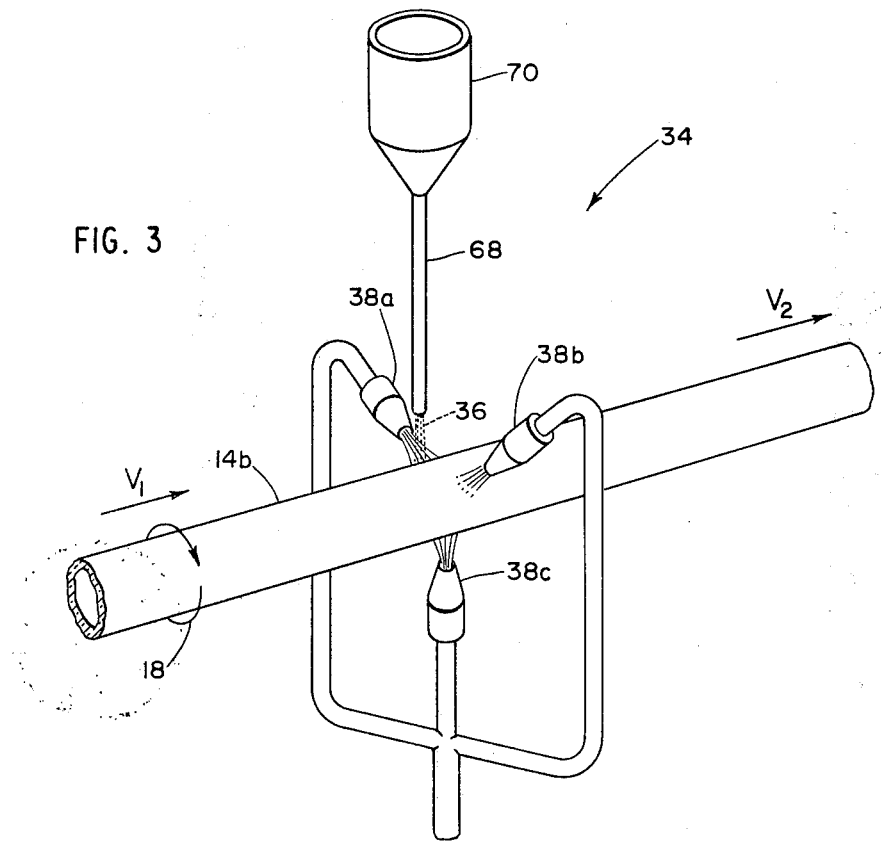
FIG. 3 is a perspective view of a station for heating and depositing operations constructed in accordance with the principles of the invention.

With reference to FIG. 3, a conduit 68 carries a metered quantity of fine crystals or powder of silica from a supply hopper 70 to a position directly above the flame of the burner 38a. A stream of inert gas can be used to carry the crystals. The end of the conduit 68 is spaced from the flame a sufficient distance to prevent any molten drops of silica from adhering to the conduit and obstructing or diverting the discharging stream 36 of crystals. As the crystal stream 36 passes through the flame, it becomes a shower of molten drops of silica which then deposit on the outer surface of the tube 14b. The burners 38a, 38b and 38c all serve to heat and soften the deposit zone of the tube 14b thereby promoting the adhesion and fusion of drops with the tube and preparing the tube for the inflating and drawing operations. Although three burners are shown, other heating arrangements can be employed provided that they uniformly heat the supply tube portion to the desired temperature. Suitable heating devices include fuel-oxygen burners, arc or inductive plasma burners, and a refractory oven with openings for the flames of such torches to penetrate the oven walls. It is recommended, however, that whatever type of heating arrangment is used, the crystal stream 36 should be directed through one of the flames so that it deposits on the tube 14b in a molten state.

Figure 4:
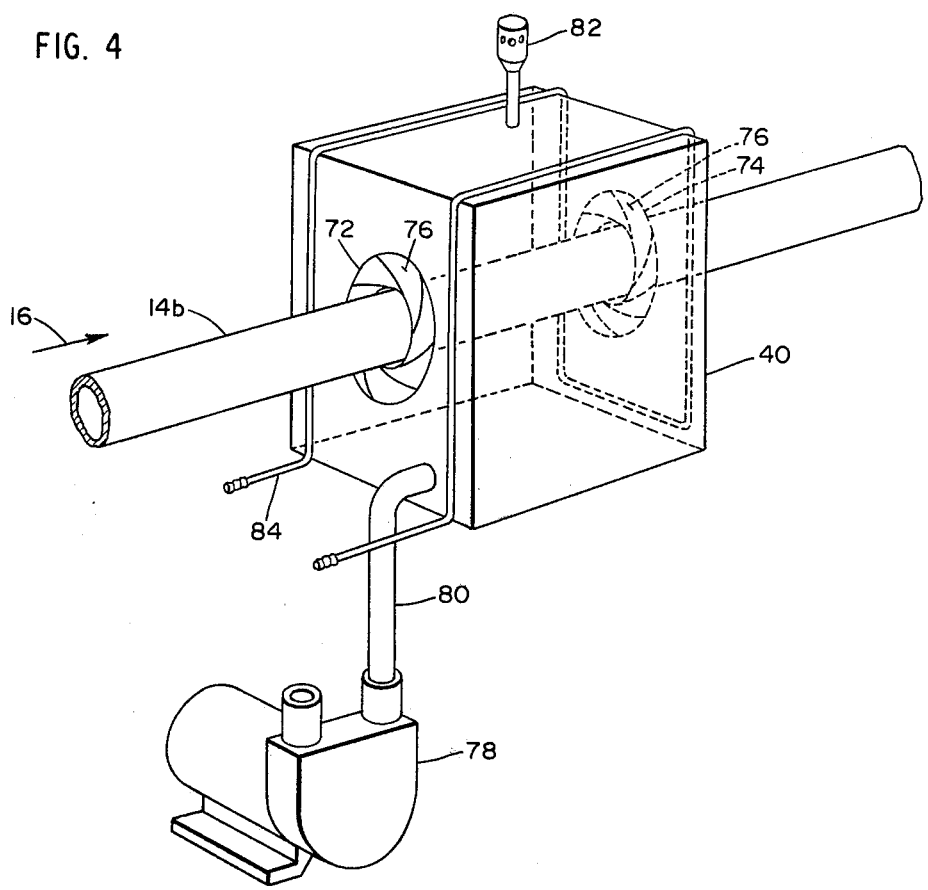
FIG. 4 is a detailed perspective view of one of the inflating and drawing stations shown in FIG. 1.

FIG. 4 shows in greater detail the pressure chamber 40 used to affect the inflating operation of the invention. Although the chamber 40 may assume a variety of configurations, the illustrated shape is a cubic box having tube inlet and outlet ports 72 and 74, respectively, in opposite faces of the box. Each port is fitted with an iris diaphragm 76 that adjusts for varying diameter tubing 14 to substantially seal the port without coming in contact with the tubing. Typically a circumferential clearance of 1 mm separates the tube and the diaphragm. The material used to form the chamber 40 is not critical provided that it has sufficient strength to withstand the desired pressure drop within the chamber. A suitable material is sheet brass.

A vacuum pump 78, communicating with the chamber 40 through a conduit 80, creates the desired vacuum. The pump 78 must be capable of generating, despite the leakage due to the diaphragm clearances, a pressure in the chamber that is in the range of 100 to 1,000 Pascals (MKS Newtons per square meter) less than the atmospheric pressure acting on the interior of the tube 14b. A pressure relief valve 82 maintains the pressure within the chamber 40 at a preselected level. A length of small diameter tubing 84 that is attached to the exterior surface of the chamber 40 carries a circulating stream of water to cool the chamber and prevent thermal stresses that may lead to leakage.

Figure 5:
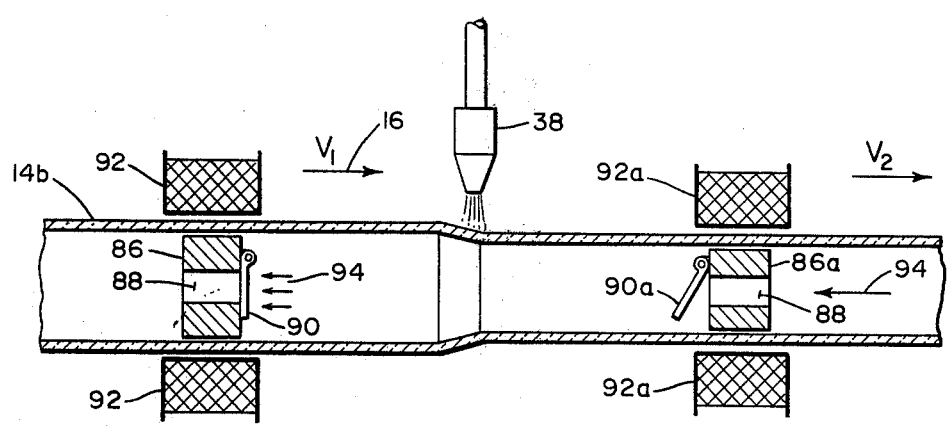
FIG. 5 is a view in side elevation and partly in section of another embodiment of an inflating and drawing station constructed in accordance with the principle of the invention.

An alternative arrangement for creating a localized pressure differential is shown in FIG. 5. Disposed in an axially spaced relationship within the tubing portions 14b and 14c are plugs 86 and 86a, respectively, each having a central passage 88 and an associated check valve 90 and 90a, respectively. The valves 90 and 90a are hinged to open in opposite mutually facing directions. Electromagnetic coils 92 and 92a hold the plugs 86 and 86a, respectively, in a closely spaced relationship with the inner surfaces of the tube portions 14b and 14c. The plugs are necessarily formed in substantial part from a ferromagnetic material such as steel. Intermediate the plugs is the section of tubing to be inflated. With this arrangement, the desired pressure differential arises when a stream 94 of compressed air or other suitable gas is directed into one open end of the tubing 14. In FIG. 5, the stream is shown entering from the right, causing the check valve 90a to open, and urging check valve 90 to close. A proper control of the pressure of the compressed air applied to the tube produces the desired pressure differential of 100 to 1,000 Pascals.

FIG. 5 also illustrates one possible configuration of the walls of the tube 14 as it is simultaneously inflated and drawn from the portion 14b into the portion 14c. In this illustration, the drawing operation is suggested by the velocity $V_2$ of the section 14c (which is greater than the velocity $V_1$ of the section 14b) and by the reduction in the diameter of the tube portion 14c as compared to the tube portion 14b. A burner 38 located over the zone of the diameter reduction softens the tubing 14 sufficiently to allow these operations. In this illustration, the inflation does not produce a distinct outward bulging of the tubing, but rather acts to support the walls, and, in cooperation with the drawing action, guides their formation into the output tube portion 14c.

The heating, depositing, inflating and drawing operations illustrated in FIGS. 3-5 can occur at the same location or at successive locations. For example, in FIG. 5 the deposit operation shown in FIG. 3 can replace the burner 38, so that all of these operations occur at essentially the same time. With reference to FIG. 4, the heating and deposit operations can occur to the left of the chamber 40, or within the chamber 40. It will be understood however, that the tube must be at a sufficiently high temperature for each of these operations. This temperature level, usually in the range of 1,850° to 2,100° Centigrade, may be attained by heating the tube a single time, or by heating it several times at separate positions along the production line 12. For example, with reference to FIG. 1, since the temperature of the tubing 14 can fall below the annealing point between the deposit stations 34 and the station 34a, it is recommended that the tubing be reheated at station 34a using an arrangement such as that shown in FIG. 3. Further, it will be understood that whenever the tubing 14 comes in contact with the chucks or other solid material it is cool enough so that there is substantially no reaction between the silica and the solid material.

The chucks 26a, 26b, 27a, 27b, 28a and 28b typically operate in pairs, with only one of the chucks holding, advancing and rotating the tubing 14 at any given time. At the beginning of an operating cycle, the left chuck, for example 27a, will be at the extreme left end of the bench 22 when its jaws close on the tube 14. At the same time the chuck 27b is located near the center of the bench with its jaws open and rotating at the same speed as those of chuck 27a. Chuck 27a will drive the tubing to the right at a preselected speed until it trips a limit switch near the center of the bench causing the jaws of the chuck 27b to close. A fraction of a second later the jaws of chuck 27a open and it returns to its initial position while the chuck 27b continues to drive the tubing at the same speed. With regard to the chucks 26a and 26b, this mode of operation must be modified to allow both chucks to close simultaneously on tube portions 14a and 14b during the soldering operation.

Figure 6:
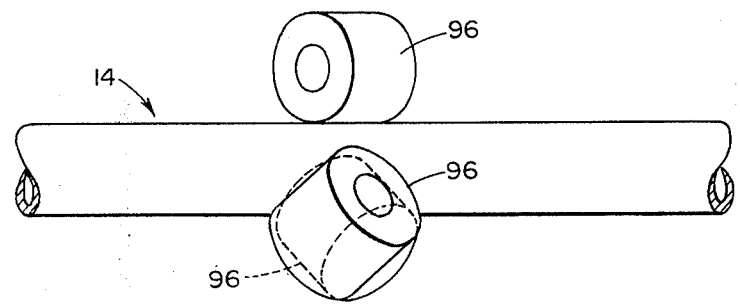
FIG. 6 is a view in side elevation of alternative translation and rotation means constructed in accordance with the invention.
Figure 7:
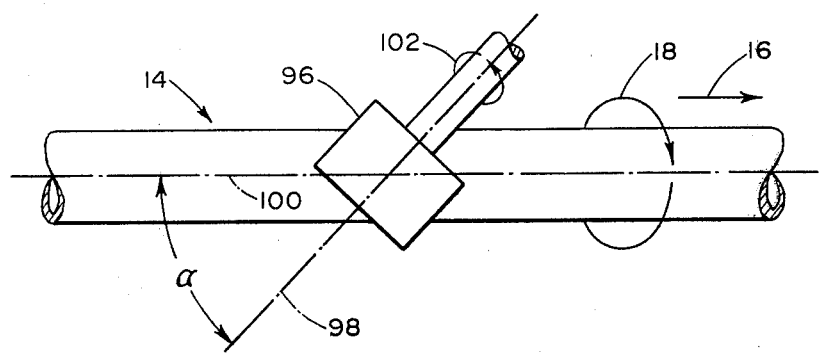
FIG. 7 is a top plan view of the apparatus shown in FIG. 6.
Figure 8:
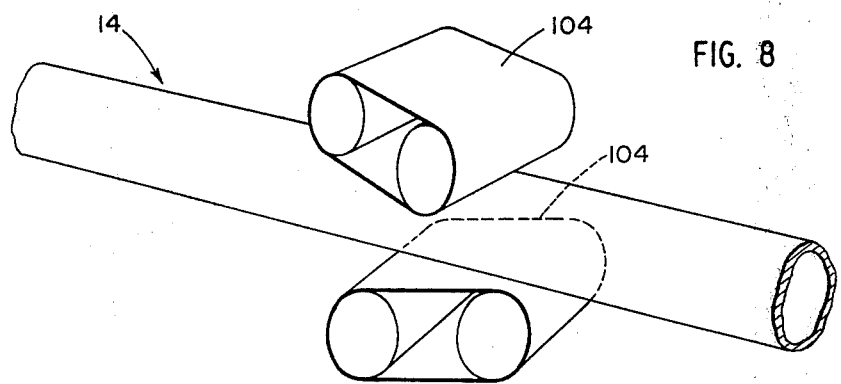
FIG. 8 is a perspective view of still other translation and rotation means constructed in accordance with the invention.

FIGS. 6 and 8 show alternative arrangements for advancing and rotating the tube 14. In FIG. 6, three rollers 96 drive the tube 14. Each roller 96 is in contact with the outside surface of the tube 14, with the points of contact lying in a common plane that is transverse to the longitudinal axis of the tube. With reference to FIG. 7, the axis of rotation 98 of the roller 96 forms an acute angle $\alpha$ with the tube axis 100. With this arrangement, an adjustment in the angle $\alpha$ varies the translational and rotational speeds of the tube. In particular, for a single rotation of the tube, it can be readily shown that $$V = \pi D \tan \alpha,$$

where $V$ is the translational velocity of the tube and $D$ is the outside diameter of the tube. Also, when the roller rotates in the direction shown by arrow 102, the tube 14 will translate to the right and rotate clockwise. The arrangement shown in FIG. 8 operates on the same principles, except that it employs two opposed belts 104 instead of the rollers 96. The belts 104 have the advantage of providing better contact with the tube 14 than the rollers 96.

In operation, the production line 12 can produce the finished tube 14d, in a wide range of dimensions and at a high rate of output. The precise dimensions are determined by a number of parameters such as the size of the supply tube 14b, the rates of deposit, the inflation pressure differentials, and the draw rates. The following table gives some examples of typical values for these and other parameters.

TABLE I

| PARAMETER | Example 1 | Example 2 | Example 3 |
|---|---|---|---|
| Supply Tube | | | |
| Inside Diameter (mm) | 40 | 40 | 35 |

TABLE I-Continued

| PARAMETER | Example 1 | Example 2 | Example 3 |
|---|---|---|---|
| Outside Diameter (mm) | 44 | 44 | 39 |
| Rate of Advance (m/hr) | 0.24 | 0.24 | 0.30 |
| Soldering Time (min) | 5 | 5 | 4 |
| 1st Deposit, Inflation and Drawing Station | | | |
| Temperature (°C) | 2050 | 2050 | 1950 |
| Pressure Differential (Pascal) | 150 | 150 | 180 |
| Silica Crystal Feed Rate (Kg/hr) | 1.0 | 1.0 | 0.5 |
| 2nd Deposit, Inflation and Drawing Station | | | |
| Temperature (°C) | — | 1850 | 1950 |
| Pressure Differential (Pascal) | — | 250 | 300 |
| Silica Crystal Feed Rate (Kg/hr) | — | 0.5 | 0.5 |
| Final Drawing Station | | | |
| Temperature (°C) | — | — | 1900 |
| Finished Tube | | | |
| Inside Diameter (mm) | 40 | 21 | 12 |
| Outside Diameter (mm) | 44 | 23 | 14 |
| Rate of Advance (m/hr) | 2.0 | 7.5 | 12.75 |

Example 3 of Table I provides a final, conventional drawing operation to produce tubing of the desired optical quality and small cross-sectional dimensions. It should be noted that in all of the examples, the differential rate of advance during one or more drawing operations yields an extremely high output or production speed for the finished tubing when compared to the input speed of the supply tube. This is due to the fact that the mass of the output tube is in large part attributable to the deposited silica crystals. In Example 1, the silica deposit accounts for approximately 88 percent of the mass of the finished tube and the supply tube accounts for approximately 12 percent.

The indicated temperatures can be measured by any conventional means such as an optical pyrometer. It is also desirable to use a conventional diameter measuring device to control the pressure differential during production. For example, if the device senses that the tube diameter is exceeding a preselected value, the pressure differential can be reduced an appropriate amount.

Although the invention has been described with reference to one or two depositing, inflating and drawing stations, any number of such stations can be employed. In addition, the supply tube portion 14a added to the production line at the soldering station can be finished tubing previously manufactured in accordance with the invention. Further, although the invention has been described with reference to the tubing 14 rotating at a constant speed, it is within the scope of this invention to rotate portions of the tubing at different speeds in order to homogenize the tubing in the softened and deposited zone or zones. For example, the supply tube 14b can be rotated at 320 revolutions per minute (rpm) and the portion 14c can be rotated at 322 rpm.

Having described and illustrated the preferred embodiments of the invention, what is claimed is:

1. A method for continuously fabricating a tube of fused silica of high optical quality and predetermined dimensions comprising, in combination, the steps of advancing longitudinally a supply tube of fused silica, rotating axially the supply tube, heating a zone of the supply tube, depositing molten drops of silica on the outer surface of the heated zone by passing fine crystals of silica through a high temperature region proximate to the heated zone so that the drops fuse with the supply tube, generating a pressure difference between the interior and the exterior of the heated zone, with the interior pressure being greater than the exterior pressure, to maintain the tube in an uncollapsed state and control its dimensions, drawing the heated zone by advancing the portions of the tube on opposite sides of the zone at differential rates, all of the foregoing steps being accomplished without the heated zone contacting a solid material so as to cause irregularities in the dimensions of said tube.

2. A method for continuously fabricating a tube of fused silica of high optical quality and predetermined dimensions comprising, in combination, the steps of advancing longitudinally a first supply tube of fused silica, rotating axially the first supply tube, heating a zone of the supply tube, depositing molten drops of silica on the outer surface of the heated zone by passing fine crystals of silica through a high temperature region proximate to the heated zone so that the drops fuse with the supply tube, generating a pressure difference between the interior and the exterior of the heated zone, with the interior pressure being greater than the exterior pressure, to maintain the tube in an uncollapsed state and control its dimensions, drawing the heated zone by advancing the portions of the tube on opposite sides of the zone at differential rates and, joining a second supply tube of fused silica to the trailing end of the advancing first supply tube, said second supply tube and said trailing end having substantially the same cross-sectional dimensions, all of the foregoing steps being accomplished without the heated zone contacting a solid material so as to cause irregularities in the dimensions of said tube.

3. The method according to claim 2 in which said pressure difference is in the range of 100 to 1,000 Pascals.

4. A method for continuously fabricating a tube of fused silica of high optical quality and predetermined dimensions comprising, in combination, the steps of advancing longitudinally a first supply tube of fused silica, rotating axially the first supply tube, heating a zone of the supply tube, depositing molten drops of silica on the outer surface of the heated zone by passing fine crystals of silica through a high temperature region proximate to the heated zone so that the drops fuse with the supply tube, pressurizing inside of the supply tube in the heated zone to maintain the tube in an uncollapsed state and control its dimensions, drawing the heated zone by advancing the portions of the tube on opposite sides of the zone at differential rates and, joining a second supply tube of fused silica to the trailing end of the advancing first supply tube, said second supply tube and said trailing end having substantially the same cross-sectional dimensions, all of the foregoing steps being accomplished without the heated zone contacting a solid material so as to cause irregularities in the dimensions of said tube.

5. The method according to claim 4 wherein said pressurizing comprises placing the heated zone in a surrounding chamber having a reduced pressure with respect to the pressure at the interior of the heated zone.

6. The method according to claim 4 wherein said pressurizing comprises holding two valved plugs within the tube at opposite ends of the heated zone, and introducing an over-pressure between the plugs.

7. The method according to claim 6 wherein said plug holding comprises energizing electromagnetic coils that each encircle the tube near one of said plugs.

8. The method according to claim 4 wherein said rotation occurs at differential rates for portions of the tube lying on opposite sides of the heated zone.

9. The method according to claim 4 wherein said high temperature region is a burner flame, said longitudinal advance occurs in a horizontal plane, and said crystals each have a maximum diameter of 250 microns and are passed through said flame in a stream of inert gas at a metered rate.

* * * * *

UNITED STATES PATENT AND TRADEMARK OFFICE
CERTIFICATE OF CORRECTION

PATENT NO. : 3,907,536
DATED : September 23, 1975
INVENTOR(S) : Claude Achener

It is certified that error appears in the above-identified patent and that said Letters Patent are hereby corrected as shown below:

Column 1, line 67, "interme-" should be --indeter- --

Column 2, line 1, "diate" should be --minate--

Signed and Sealed this ninth Day of March 1976

[SEAL]

Attest:

RUTH C. MASON
*Attesting Officer*

C. MARSHALL DANN
*Commissioner of Patents and Trademarks*